United States Patent [19]

Liang et al.

[11] 4,310,609

[45] Jan. 12, 1982

[54] METAL OXIDE COMPOSITE CATHODE MATERIAL FOR HIGH ENERGY DENSITY BATTERIES

[75] Inventors: Charles C. Liang, Clarence; M. Elizabeth Bolster, East Amherst; Robert M. Murphy, Lancaster, all of N.Y.

[73] Assignee: Wilson Greatbatch Ltd., Clarence, N.Y.

[21] Appl. No.: 104,384

[22] Filed: Dec. 17, 1979

[51] Int. Cl.³ ............................................. H01M 6/14
[52] U.S. Cl. .................................. 429/194; 429/218; 429/219; 429/220; 429/224
[58] Field of Search ................ 429/194, 196, 218–224, 429/231, 229, 191; 423/592, 593; 252/510, 518, 519

[56] References Cited

U.S. PATENT DOCUMENTS

| | | | |
|---|---|---|---|
| 3,415,687 | 12/1968 | Methlie | 429/195 |
| 3,423,242 | 1/1969 | Meyers et al. | 429/194 |
| 3,541,629 | 11/1970 | Bowman | 423/592 X |
| 3,945,848 | 3/1976 | Dey | 429/198 |
| 3,996,069 | 12/1976 | Kronenberg | 429/197 |
| 3,998,658 | 12/1976 | Dey | 429/194 |
| 4,016,338 | 4/1977 | Lauck | 429/194 X |
| 4,085,259 | 4/1978 | Lauck | 429/218 X |
| 4,119,707 | 10/1978 | Thome et al. | 423/592 |
| 4,141,963 | 2/1979 | Miller | 423/592 |
| 4,158,722 | 6/1979 | Lauck | 429/194 |

*Primary Examiner*—Anthony Skapars
*Attorney, Agent, or Firm*—Christel, Bean & Linihan

[57] ABSTRACT

An electrochemical cell incorporating cathode materials comprising at least one metal oxide, at least one metal, or mixture of metals or metal oxides incorporated in the matrix of a host metal oxide. The cathode materials of this invention are constructed by the chemical addition, reaction, or otherwise intimate contact of various metal oxides and/or metal elements during thermal treatment in mixed states. The materials thereby produced contain metals and oxides of the groups IB, IIB, IIIB, IVB, VB, VIB, VIIB, and VIII, which includes the noble metals and/or their oxide compounds.

The incorporation of the metal oxides, metals or mixtures thereof substantially increases the discharge capacity and the overall performance of the cathode materials.

30 Claims, 3 Drawing Figures

METAL OXIDE COMPOSITE CATHODE MATERIAL FOR HIGH ENERGY DENSITY BATTERIES

BACKGROUND OF THE INVENTION

This invention relates to the art of electrochemical cells and more particularly to a new and improved electrochemical cell and cathode therefor comprising a Group IA metal anode and a composite metal/metal oxide or metal oxide cathode.

Light metals have exceptionally high energy density when employed as the anode material in electrochemical cells owing to their low atomic weight and high standard potential. This high chemical activity of light metal anode material requires the use of a nonaqueous electrolyte and a cathode which meets the rigorous requirements for such a cell. Most cathode materials are too readily soluble in a nonaqueous electrolyte, and thereby reduce the useful capacity of such an electrode after storage.

It is known to use metal oxides, particularly heavy metal oxides, as cathode materials in nonaqueous electrochemical cells. For example U.S. Pat. No. 3,945,848 discloses the use of cobalt (III) oxide, U.S. Pat. No. 4,158,722 discloses a cell employing a chromium oxide cathode, and U.S. Pat. No. 3,423,242 discloses a cell employing a vanadium pentoxide cathode.

A continuing problem encountered with these and other cells having metal oxide cathodes is the relatively low discharge potential and consequent low energy density. Additionally, as noted above, the appreciable solubility of the metal oxides in the nonaqueous electrolyte leads to a metal deposit on the anode after extended storage, thereby causing a loss of capacity.

SUMMARY OF THE INVENTION

This invention relates to electrochemical cells comprised of a Group IA metal acting as the anode and a cathode of a composite material prepared by the chemical addition, reaction, or otherwise intimate contact of several metal oxides, metal or metal oxide/elemental metal combinations during thermal treatment in mixed states. Alternatively, the cathode may comprise the product of a single metal oxide thermally treated according to the invention.

It is an object of this invention to provide a new and improved electrochemical cell having relatively high energy density, discharge capacity, and a wide operating temperature range.

It is a further object of this invention to provide such an electrochemical cell of high reliability and utility even after prolonged storage.

It is another object of this invention to provide such an electrochemical cell having a relatively high open circuit voltage and current capacity.

It is still another object of this invention to provide an electrochemical cell having an oxidizable active anode material and a cathode material combining various metal oxides or oxide/elemental metal combinations, particularly metal oxides or oxide/elemental metal combinations prepared by the thermal treatment methods of the invention.

The foregoing and additional advantages and characterizing features of the present invention will become apparent from the following detailed description which includes the following figures.

DETAILED DESCRIPTION OF THE INVENTION

Figure 1:
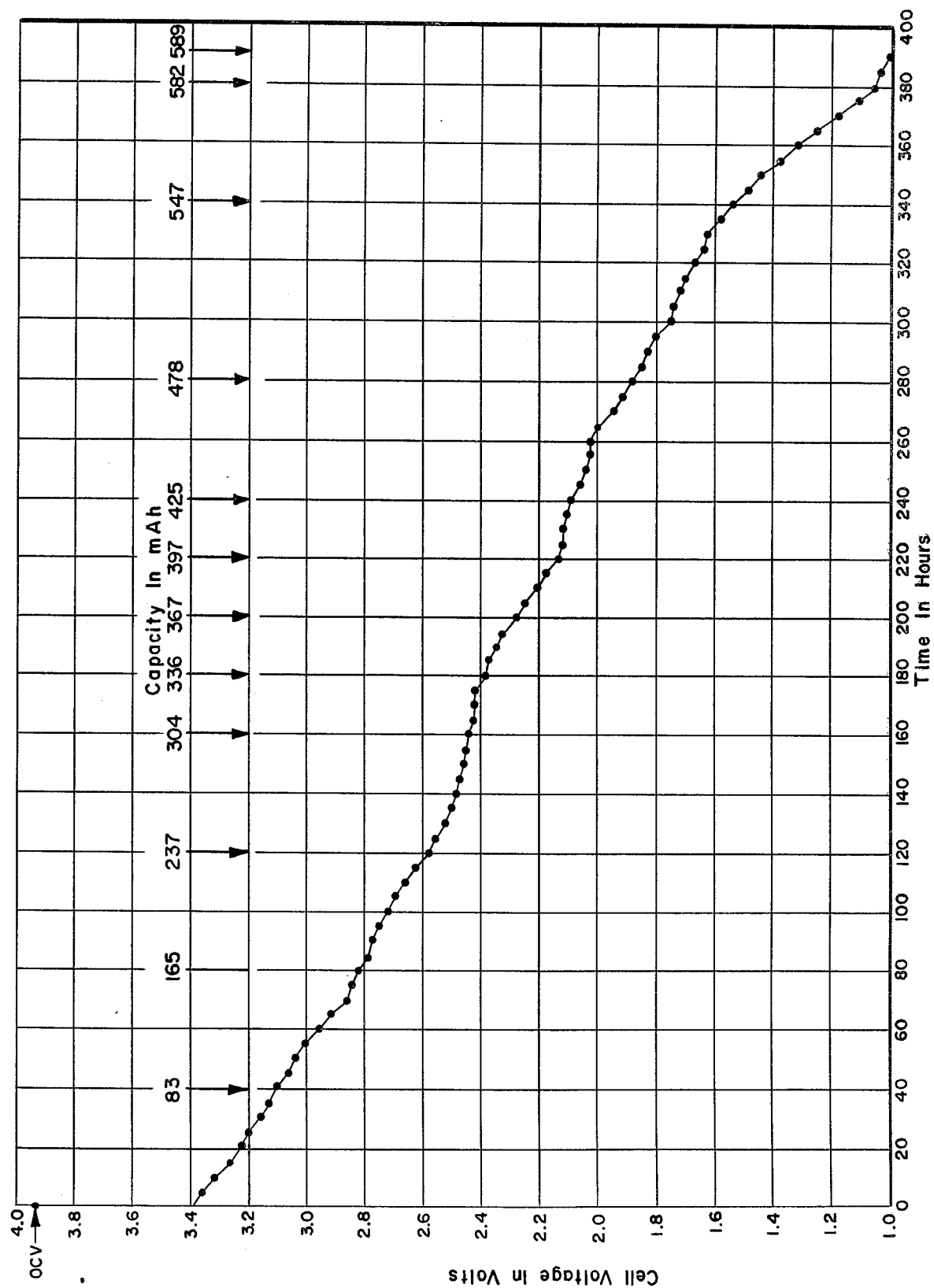
FIG. 1 is a voltage-time plot for a cell according to one embodiment of the invention.

The electrochemical cell of the present invention comprises an anode of a metal selected from Group IA of the Periodic Table of the Elements, including lithium, sodium, potassium, etc., and their alloys and intermetallic compounds including, for example Li-Si, Li-Al, Li-B and Li-Si-B alloys and intermetallic compounds. The form of the anode may vary, but typically is a thin sheet or foil of the anode metal, and a current collector having an extended tab or lead affixed to the anode sheet or foil.

The electrochemical cell of the present invention further comprises a cathode of electronically conductive composite material which serves as the other electrode of the cell. The electrochemical reaction at the cathode involves conversion of ions which migrate from the anode to the cathode into atomic or molecular forms. The composite cathode material of the invention comprises at least one metal oxide, at least one metal, or a mixture of metals or metal oxides incorporated in the matrix of a host metal oxide.

The cathode material of this invention can be constructed by the chemical addition, reaction, or otherwise intimate contact of various metal oxides and/or metal elements during thermal treatment in mixed states. Alternatively, the cathode material may be the product of the thermal treatment of a single metal oxide. The materials thereby produced contain metals and oxides of the groups IB, IIB, IIIB, IVB, VB, VIB, VIIB, and VIII which includes the noble metals and/or their oxide compounds.

According to the invention, readily decomposable compounds consisting of metals from Groups IB, IIB, IIIB, IVB, VB, VIB and VIIB, as well as similarly decomposable compounds from Group VIII, are thermally treated so as to effect the rapid preparation of the oxides or the respective metal elements themselves to be utilized further in the preparation of suitable cathode materials. Such readily decomposable materials include, but are not limited to, those classes of compounds known as nitrates, nitrites, carbonates, and/or ammonium salts. The precursor materials (i.e., nitrates, nitrites, carbonates, ammonium compounds, etc.) may be decomposed in a combined state or individually decomposed and thereafter combined in an oxide/decomposable metal salt compound and subsequently decomposed to form the cathode composite matrix. Such composite materials may be pressed into a cathode pellet with the aid of a suitable binder material and a material having electronic conduction characteristics such as graphite. In some cases, no binder material or electronic conductor material is required to provide a similarly suitable cathode body. Further, some of the cathode matrix samples may also be prepared by rolling, spreading or pressing a mixture of the materials mentioned above onto a suitable current collector such as Exmet wire mesh. The prepared cathode bodies as described above may be used as either a solid cathode prepared by directly pressing the material into a battery can assembly or a wound cathode structure similar to a "jellyroll".

The cathode is separated in both cases from the Group IA anode material by a suitable separator material such as a porous glass woven or Teflon (Dupont) fabrics.

Preferred cathode composites are prepared by thermally decomposing a vanadium salt, suitably ammonium metavanadate, to produce vanadium pentoxide. A decomposable metal salt, suitably the nitrate, of a second metal is then added to the vanadium pentoxide, thoroughly mixed therewith and thereafter ignited. The second metal is most preferably selected from the group consisting of silver, copper, manganese and mixtures thereof. The resultant composite cathode includes $V_2O_x$ wherein $x \leq 5$ combined with one or more of $Ag_2O_x$ wherein $x=0$ to 1; $CuO_x$ wherein $x=0$ to 1; and $M_nO_x$ wherein $x=1$ to 3. Thus, the composite cathode material may be described as a metal oxide-metal oxide, a metal-metal oxide, or a metal-metal oxide-metal oxide.

The electrochemical cell of the present invention further comprises a nonaqueous, ionic conductive electrolytic solution of a Group IA metal salt operatively associated with the anode and the cathode. The electrolytic solution serves as a medium for migration of ions between the anode and cathode during the cell electrochemical reactions. The nonaqueous solvents suitable for the invention are chosen so as to exhibit those physical properties necessary for ionic transport (low viscosity, low surface tension, and wettability). The nonaqueous solvent of the electrolyte may be any one or more of the organic solvents which is substantially inert to the anode and cathode electrode materials, such as tetrahydrofuran, propylene carbonate, methyl acetate, acetonitrile, dimethyl sulfoxide, dimethyl formamide, dimethyl acetamide, 1,2-dimethoxyethane and others. The nonaqueous solvent also may be one or a mixture of more than one of the inorganic solvents which can serve as both a solvent and a depolarizer, such as thionyl chloride, sulfuryl chloride, selenium oxychloride, chromyl chloride, phosphoryl chloride, phosphorous sulfur trichloride and others. The Group IA metal salt of the nonaqueous electrolytic solution may be chosen from, for example, lithium halides, such as LiCl and LiBr, and lithium salts of the $LiMX_n$ type, such as $LiAlCl_4$, $Li_2Al_2Cl_6O$, $LiClO_4$, $LiAsF_6$, $LiSbF_6$, $LiSbCl_6$, $Li_2TiCl_6$, $Li_2SeCl_6$, $Li_2B_{10}Cl_{10}$, $Li_2B_{12}Cl_{12}$ and others. Alternatively, the corresponding sodium or potassium salts may be used.

When the mechanical structure or configuration of the cell requires, a separator can be employed to provide physical separation between the anode and the cathode current collectors. The separator is of electrically insulative material to prevent an internal electrical short circuit in the cell between the anode and the cathode current collectors. The separator material also must be chemically unreactive with the materials of the anode and cathode current collectors and both chemically unreactive with and insoluble in the electrolytic solution. In addition, the separator material must have a degree of porosity sufficient to allow flow therethrough of the electrolytic solution during the electrochemical reaction of the cell. Illustrative separator materials include non-woven glass, Teflon, glass fiber material, ceramics and materials commercially available under the designations Zitex (Chemplast Inc.), Celgard (Celanese Plastic Company Inc.) and Dexiglas (C. H. Dexter, Div. Dexter Corp.). The form of the separator typically is a sheet which is placed between the anode and cathode of the cell in a manner preventing physical contact between the anode and cathode, and such contact also is prevented when the combination is rolled or otherwise formed into a cylindrical configuration.

The electrochemical cell of the present invention operates in the following manner. When the ionic conductive electrolytic solution becomes operatively associated with the anode and cathode of the cell, an electrical potential difference is developed between terminals operatively connected to the anode and cathode. The electrochemical reaction at the anode includes oxidation to form metal ions during discharge of the cell. The electrochemical reaction at the cathode involves conversion of ions which migrate from the anode to the cathode into atomic or molecular forms. It is observed that the systems of this invention have a wide operating temperature range, e.g., $-55°$ to $+225°$ C.

The electrochemical cell according to the present invention is illustrated further by the following examples.

EXAMPLE I

Commercially available ammonium vanadate, $NH_4VO_3$ (Cerac, 99.99%, $-80$ mesh) was thermally decomposed to vanadium pentoxide, $V_2O_5$, in an air furnace at elevated temperatures. Evidence for the complete decomposition was based upon the distinct lack of $NH_{3(g)}$ and the comparison of product yield to the theoretical yield for $V_2O_5$.

Aliquots of aqueous $AgNO_3$ of known concentration were quantitatively added to weighed amounts of the previously prepared $V_2O_5$. The mixture was stirred and evaporated to dryness in an air oven maintained at a temperature less than 100° C. At the end of the initial drying period, the mixtures were stirred and ground to ensure homogeneity. After a period of time, the samples were subsequently baked out at an initial temperature of about 180° C. Upon reaching thermal equilibrium, the oven temperature level was gradually raised to about 360° C. and maintained at that temperature for a minimum period of 24 hours. During the final heating/decomposition period, copious amounts of nitrogen oxide gases were detected. At specific time intervals after the evolution of the nitrogen oxides, the samples were removed and stirred vigorously. Finally, each sample was removed from the furnace, cooled in a desiccator, and reweighed.

Various weighed amounts of the treated material were blended with the appropriate amounts of graphite powder (Fisher) and Teflon 7A binder (Dupont) and intimately mixed. A one-inch diameter disc of the cathode material was then pressed onto a nickel Exmet (Delker Corp.) current collector. The construction of the remainder of the cell is effected by employing the following steps:

Separator material (Mead glass, 6.5% binder) was cut to the appropriate dimensions and wrapped around the cathode body. A piece of lithium metal partially supported by a nickel Exmet screen and lead was fashioned to surround the cathode. The cell was then fitted into the appropriate container. An exact amount of the electrolyte solution comprised of one molar lithium perchlorate ($LiClO_4$) in an equal volume mixture of propylene carbonate and 1,2-dimethoxyethane was added to each of the cells.

Figure 2:
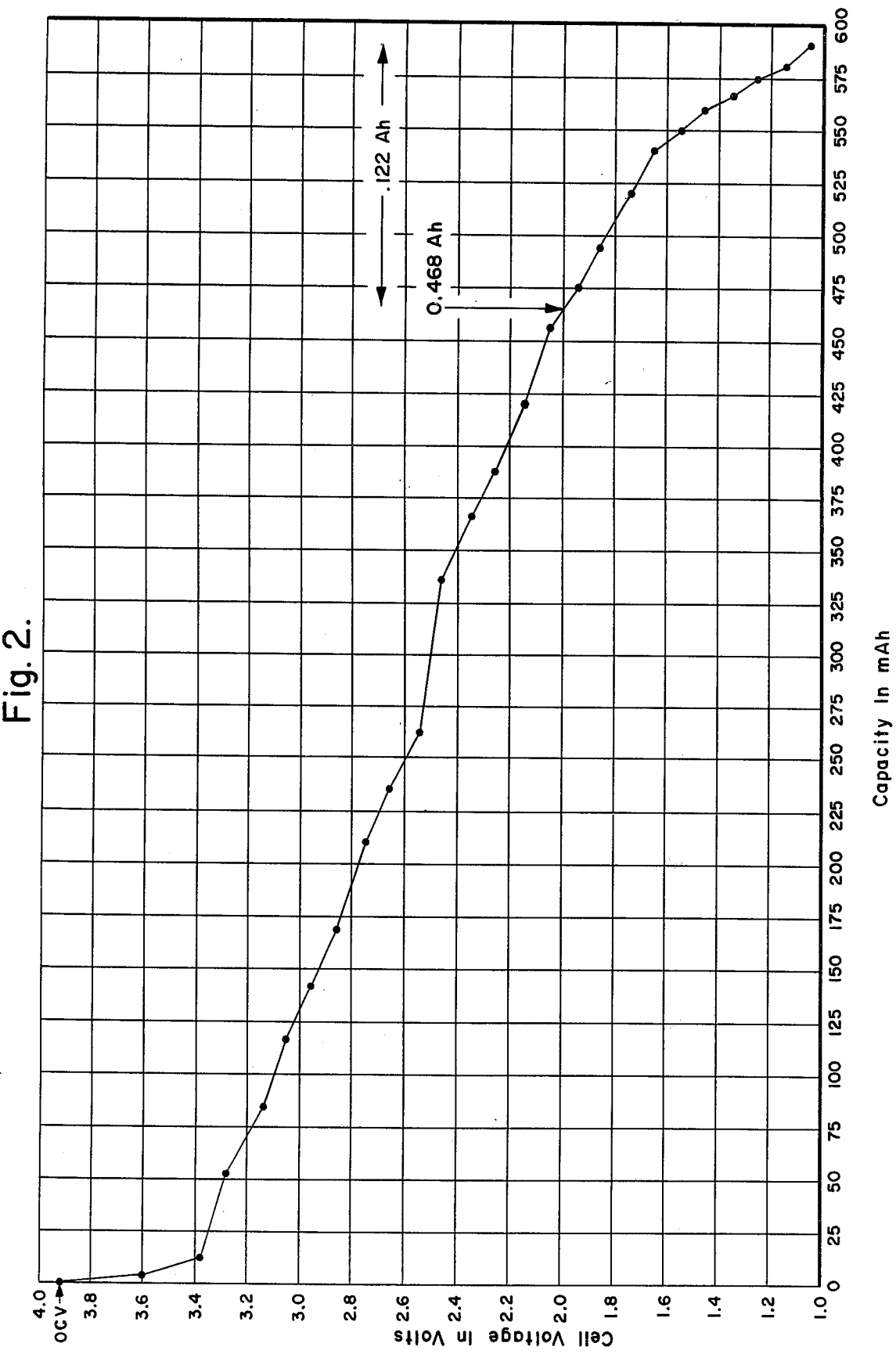
FIG. 2 is a voltage-cumulative capacity plot for a cell according to one embodiment of the invention.

Specifically, 1.82 grams of silver vanadium oxide (the silver to vanadium ratio equals 0.31) was weighed and mixed with 0.3 g graphite powder and 0.3 g Teflon 7A solid binder. This cathode material was pressed into a disc at a 20,000 lb. load. The remainder of the cell was constructed as previously described. The open circuit voltage immediately after cell construction was 3.93 volts. A load of 1.5 kohms was applied to the cell. The voltage-time results are illustrated in FIG. 1. A plot of voltage versus cumulative capacity is given in FIG. 2. It is apparent that the discharge curve for this particular system is nearly linear.

EXAMPLE 2

Samples of copper vanadium oxide were prepared in the same manner as described in Example 1. Various amounts of the thus treated material were mixed with the appropriate amounts of graphite powder and binder material. The construction of the remainder of the cell corresponds directly to that for Example 1.

Figure 3:
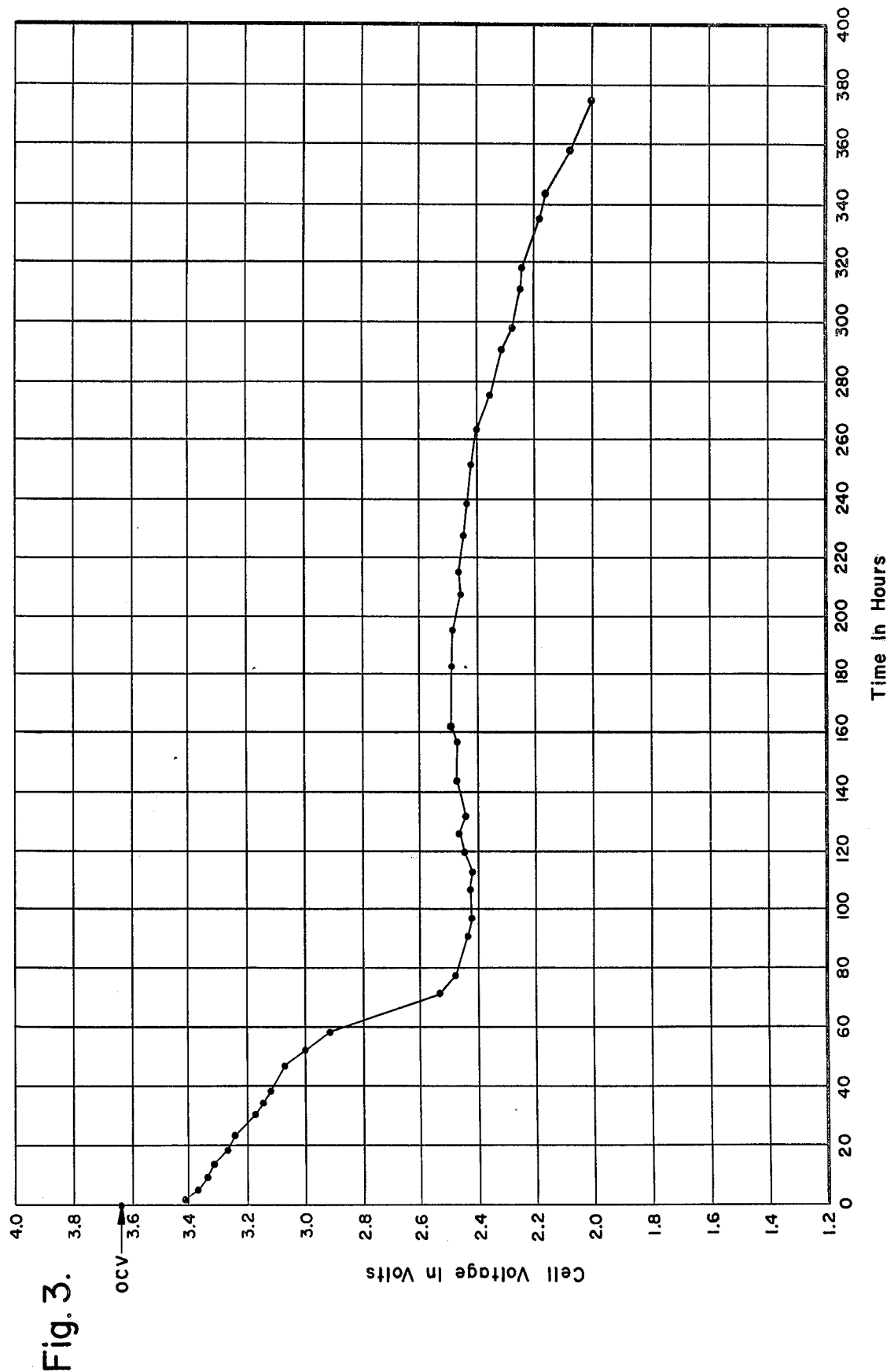
FIG. 3 is a voltage-time plot for a cell according to another embodiment of the invention.

Specifically 2.3 g of copper vanadium oxide (the copper to vanadium ratio equals 0.35) was intimately mixed with 0.3 g of Teflon 7A binder and 0.3 g of carbon graphite. This cathode mixture was pressed into a one inch disc at a 20,000 lb. load pressure. The remainder of the cell was constructed as previously described. The open circuit voltage immediately following cell construction was 3.64 volts. A load of 1.5 kohms was applied to the cell. The cumulative capacity, to a 2 volt cutoff point, was 640 mAh. The voltage-time results are presented in FIG. 3.

EXAMPLE 3

Samples of copper vanadium oxide were prepared exactly as in Example 2. The one distinguishing alteration in cell construction was the use of 1M LiClO$_4$ in propylene carbonate alone. Significantly higher voltages under load were observed for this embodiment until a voltage of 3 volts was reached. At that point, the values decreased to the 2 volt cutoff rapidly. The cumulative capacity was 150 mAh.

EXAMPLE 4

A cell consisting solely of V$_2$O$_5$ from the decomposition of ammonium vanadate as described in Example 1 was constructed. Specifically, 1.82 g of V$_2$O$_5$, 0.3 g graphite, and 0.3 g of Teflon 7A was mixed and pressed into the cathode structure as previously described in Examples 1–3. The open circuit voltage for this cell was 3.81 volts. A load of 1.5 kohm was applied to the cell. A total of 8.5 mAh was obtained for the capacity of this cell to a 2 volt cutoff value.

EXAMPLE 5

Commercially available silver oxide, Ag$_2$O (Cerac, 99.5%), was thermally treated at 145° C. in an air oven. Cells were then constructed in the exact manner as previously described. Specifically 2.2 g of Ag$_2$O was intimately mixed with 0.46 g of Teflon 7A and 0.43 g of graphite. The electrolyte for this cell was 1M LiClO$_4$ in propylene carbonate only. The open circuit voltage immediately after cell construction was 3.56 volts. A load of 1.5 kohm was applied to the cell and, after a period of four hours, the running voltage dropped to 2.4 volts. The total capacity to the 2 volt cutoff, however, was 341 mAh.

EXAMPLE 6

Silver oxide, Ag$_2$O, was treated in the manner as described in Example 5. Specifically, 2.1 g of Ag$_2$O was intimately mixed with 0.44 g Teflon 7A binder and 0.41 g of graphite powder. The cell thereby produced differed from that in Example 5 by the electrolyte solution—1M LiClO$_4$ in 50/50 (V/V) propylene carbonate/1,2-dimethoxyethane. The open circuit voltage after cell preparation was 3.54 volts. A load of 1.5 kohm was applied to the cell. As with the case of Example 5, the running voltage decreased rapidly to 2.4 volts, (8.5 h). The cumulative capacity, however, to the 2 volt cutoff, was 441 mAh.

EXAMPLE 7

X-ray powder patterns have been obtained for V$_2$O$_5$, silver vanadium oxide with a silver to vanadium ratio of 0.35, silver vanadium oxide with a silver to vanadium ratio of 0.50, and copper vanadium oxide with a copper to vanadium ratio of 0.35. The results are numerically presented in Table I. It can be readily seen that the precursor material, V$_2$O$_5$, has been significantly altered in all three other examples so as to produce new chemical species. The above is especially true for the silver vanadium oxide with a silver to vanadium ratio of 0.35 and silver vanadium oxide with a silver to vanadium ratio of 0.50 where there is strong definite proof that the symmetries to corresponding lattice d-spacings for 2θ values above 60° C. have been destroyed, thereby indicating the likely inclusion of silver species or copper species between those planes.

TABLE I

X-ray Powder Pattern Data for V$_2$O$_5$ and Metal Composite Cathode Materials

| | 2θ Value | | |
|---|---|---|---|
| V$_2$O$_5$ | Ag$_{0.035}$VO$_x$ (x = 2.5) | Ag$_{0.50}$VO$_x$ (x = 2.5) | Cu$_{0.35}$VO$_x$ (x = 2.5) |
| 19.3 | 22.4 | | 24.2 |
| 25.2 | 25.5 | | 25.6 |
| 30.0 | 28.9 | 28.8 | 28.6 |
| | 29.5 | 30.1 | 30.5 |
| 31.4 | | 31.8 | |
| 33.3 | 33.3 | 35.7 | |
| | 34.7 | | |
| 38.1 | 38.1 | 38.1 | 38.1 |
| 40.3 | | 40.1 | |
| 44.3 | 44.3 | 44.2 | 44.3 |
| 46.4 | 45.7 | | |
| 47.8 | 48.6 | | |
| 50.25 | 50.3 | 50.5 | 50.7 |
| 51.2 | 52.6 | | |
| 54.75 | 59.3 | 53.4 | 56.6 |
| 60.2 | 60.6 | 59.5 | 60.6 |
| 61.2 | | 62.25 | |
| 64.7 | | | 64.6 |
| 71.6 | | | |
| 77.7 | | | 77.7 |

EXAMPLE 8

A test cell was constructed having a lithium anode, a composite cathode material as prepared in Example I and an electrolyte comprising lithium bromide dissolved in selenium oxychloride. In particular, the anode of the cell was a lithium foil having a width of about 1.4 cm, a length of about 6.6 cm. and a thickness of about 0.06 cm. with a nickel current collector having an extending lead or tab cold welded on the lithium foil. The cathode was fabricated by providing a thin layer of the composite cathode material having a width of about 1.5 cm, a length of about 7 cm. and a weight of about 0.17 g and then by pressing this layer on a thin expanded metal screen of stainless steel having an extending lead or tab. A separator in the form of a sheet of Celgard material also was provided and placed between the anode and cathode layers, whereupon the anode/- separator/cathode assembly or combination was rolled or wound into a cylindrical configuration and placed in a glass vial having an outer diameter of about 1.3 cm. with the anode and cathode current collector leads extending out through the open end of the vial. A depolarizer-electrolyte solution was prepared comprising lithium bromide dissolved in selenium oxychloride to provide a 0.1 M solution having a total volume of 2.0 ml. The solution was injected into the glass vial, and then the open end of the vial was sealed closed with a Teflon lined stopper in a manner maintaining the spaced anode and cathode leads externally accessible for electrical connection. The test cell had an open circuit voltage of about 3.5 volts and then an initial load voltage of about 3.4 volts when discharged at room temperature under a constant load of 3.3 kilohms.

EXAMPLE 9

A test cell was constructed having a lithium anode, a composite cathode material as prepared in Example 2 and an electrolyte comprising lithium aluminum tetrachloride dissolved in thionyl chloride. In particular, the anode of the cell was a lithium foil having a width of about 1.5 cm., a length of about 7 cm and a thickness of about 0.06 cm. with a nickel current collector having an extending lead or tab cold welded on the lithium foil. The cathode was fabricated by providing a quantity of carbon having a weight of about 0.25 g and containing binder of Teflon material in an amount of approximately 5% by weight and spreading the carbon onto a nickel expanded metal element having a width of about 1.5 cm. and a length of about 7 cm. and including an extending lead or tab. A separator in the form of a sheet of nonwoven glass material was provided and placed between the anode and cathode layers. The anode/separator/cathode assembly or combination was wound into a cylindrical shape and inserted in a glass vial having an outer diameter of 1.3 cm. with the anode and cathode current collector leads extending out through the open end of the vial. The electrolyte solution was prepared comprising lithium aluminum tetrachloride dissolved in thionyl chloride to provide a 1.0 M solution having a total volume of 2 ml. The solution was injected into the glass vial, and then the open end of the vial was sealed closed with a Teflon lined stopper in a manner maintaining the spaced anode and cathode leads externally accessible for electrical connection. The test cell had an open circuit voltage of 3.6 volts and was discharged at room temperature under a constant load of 182 ohms with the average current drain rate being approximately 20 milliamperes. During discharge the cell had an initial load voltage of about 3.4 volts and a load voltage of about 3.3 volts after a 32 hour discharge period.

The above detailed description and examples are intended for purposes of illustrating the invention and are not to be construed as limiting.

What is claimed is:

1. An electrochemical cell having an anode of a Group 1A metal which is electrochemically oxidizable to form metal ions in the cell upon discharge to generate electron flow in an external electrical circuit connected to the cell and a cathode of electronically conductive material and characterized by an ionic conductive electrolyte solution operatively associated with the anode and the cathode, the cathode comprising a composite oxide matrix of vanadium oxide chemically reacted with at least one other metal selected from the group consisting of groups IB, IIB, IIIB, IVB, VIB, VIIB and VIII, said composite oxide being the thermal decomposition and reaction product of a mixture of vanadium oxide with at least one decomposable metal compound of said groups.

2. An electrochemical cell of claim 1, wherein the decomposable compound is selected from the group consisting of metal nitrate, metal nitrite, metal carbonate, and ammonium salts of transition metal oxyanions.

3. An electrochemical cell of claim 1 wherein one component of the cathode comprises $V_2O_x$ wherein x is less than or equal to 5 prepared by the thermal treatment of ammonium vanadate.

4. An electrochemical cell of claim 1 wheren one component of the cathode comprises $Ag_2O_x$ wherein x ranges from 0 to 1 prepared by the thermal treatment of silver nitrate.

5. An electrochemical cell of claim 1, wherein the cathode comprises a mixture of $V_2O_x$ wherein x is less than or equal to 5 and $Ag_2O_x$ wherein x ranges from 0 to 1 prepared by the thermal treatment of vanadium pentoxide and silver nitrate.

6. An electrochemical cell of claim 1, wherein the cathode further comprises a suitable binder material.

7. An electrochemical cell of claim 6, wherein the binder material is carbon.

8. An electrochemical cell of claim 6, wherein the binder material is a mixture of carbon and Teflon.

9. An electrochemical cell of claim 1, wherein the electolytic solution comprises a Group IA metal salt dissolved in a nonaqueous solvent.

10. An electrochemical cell of claim 9, wherein the nonaqueous solvent comprises an inorganic solvent.

11. An electrochemical cell of claim 10, wherein the nonaqueous solvent comprises an organic solvent.

12. An electrochemical cell of claim 1, wherein the cathode comprises a mixture of silver vanadium oxide and manganese oxide $MnO_x$ wherein x ranges from 1 to 3.

13. An electrochemical cell of claim 1, wherein the cathode comprises a mixture of $Ag_2O_x$ wherein x ranges from 0 to 1 and manganese oxide $MnO_x$, wherein x ranges from 1 to 3 prepared by the simultaneous decomposition of silver nitrate and manganese nitrate.

14. An electrochemical cell of claim 1, wherein the cathode comprises manganese oxide $MnO_x$ wherein x ranges from 1 to 3 prepared by the decomposition of manganese nitrate with subsequent addition of $Ag_2O_x$ wherein x ranges from 0 to 1.

15. An electrochemical cell of claim 1, wherein the cathode comprises a mixture of silver oxide, $Ag_2O_x$ wherein x ranges from 0 to 1 and manganese oxide, $MnO_x$ wherein x ranges from 1 to 3 prepared by the decomposition of silver nitrate in the presence of manganese oxide.

16. An electrochemical cell of claim 1, wherein one component of the cathode comprises copper vanadium oxide.

17. An electrochemical cell of claim 1, wherein the cathode comprises a mixture of copper vanadium oxide and manganese oxide, $MnO_x$ wherein x ranges from 1 to 3.

18. An electrochemical cell of claim 1, wherein one component of the cathode comprises a mixture of copper oxide, $CuO_x$, wherein x ranges from 0 to 1 and manganese oxide, $MnO_x$, wherein x ranges from 1 to 3.

19. A cathode for an electrochemical cell comprising the composite oxide matrix of vanadium oxide chemically reacted with at least one metal selected from the group consisting of silver, copper, manganese and mixtures thereof, said composite oxide being the thermal decomposition and reaction product of a mixture of vanadium oxide with at least one decomposable metal compound of said group.

20. A cathode of claim 19, wherein the decomposable compound is selected from the group consisting of metal nitrate, metal nitrite, metal carbonate, and ammonium salts of transition metal oxyanions.

21. A cathode of claim 19, wherein one component of the cathode comprises $V_2O_x$ wherein x is less than or equal to 5 prepared by thermal treatment of ammonium vanadate.

22. A cathode of claim 19, wherein one component of the cathode comprises $Ag_2O_x$ wherein x ranges from 0 to 1 prepared by thermal treatment of silver nitrate.

23. A cathode of claim 19, wherein the cathode comprises a mixture of $V_2O_x$ wherein x is less than or equal to 5 and $Ag_2O_x$ wherein x ranges from 0 to 1 prepared by thermal treatment of a mixture of vanadium pentoxide and silver nitrate.

24. A cathode of claim 19, wherein the cathode further comprises a suitable binder material.

25. A cathode of claim 24, wherein the binder material is carbon.

26. A cathode of claim 24, wherein the binder material is a mixture of carbon and Teflon.

27. The cathode of claim 19 wherein the decomposable metal compound is a copper salt and wherein said thermally decomposed product includes $CuO_x$ wherein x ranges from 0 to 1.

28. The cathode of claim 19 wherein the decomposable metal compound is a manganese salt and wherein said thermally decomposed product includes $M_nO_x$ wherein x ranges from 1 to 3.

29. The cathode of claim 19 wherein the decomposable metal compound comprises a mixture of copper and manganese salts and wherein said thermally decomposed product includes $CuO_x$ wherein x ranges from 0 to 1 and $MnO_x$ where x ranges from 1 to 3.

30. The cathode of claim 19 wherein the decomposable metal compound comprises a mixture of silver and manganese salts and wherein said thermally decomposed product includes $Ag_2O_x$ wherein x ranges from 0 to 1 and $MnO_x$ wherein x ranges from 1 to 3.

* * * * *